Jan. 26, 1971  J. J. QUACKENBUSH ET AL  3,558,410
EXTRUSION METHOD AND APPARATUS FOR THE EXTRUSION
OF RECTANGULAR TUBES OF THERMOPLASTIC SHEET
Original Filed June 28, 1965   5 Sheets-Sheet 1
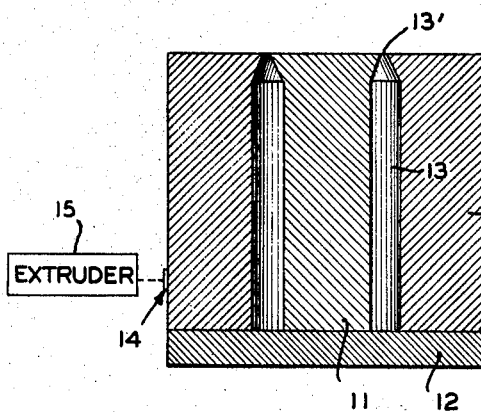
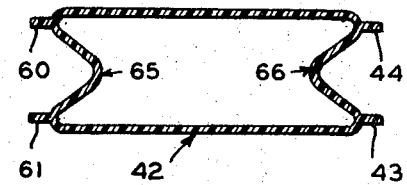
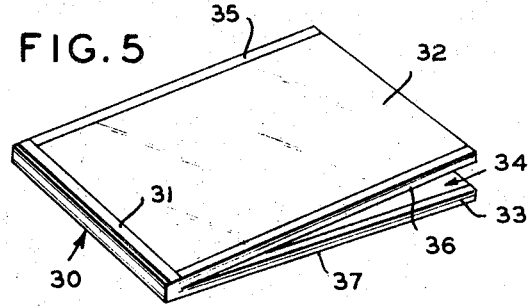
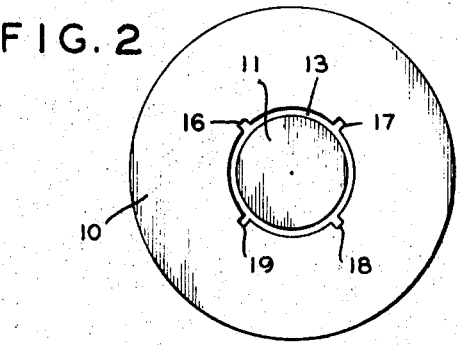
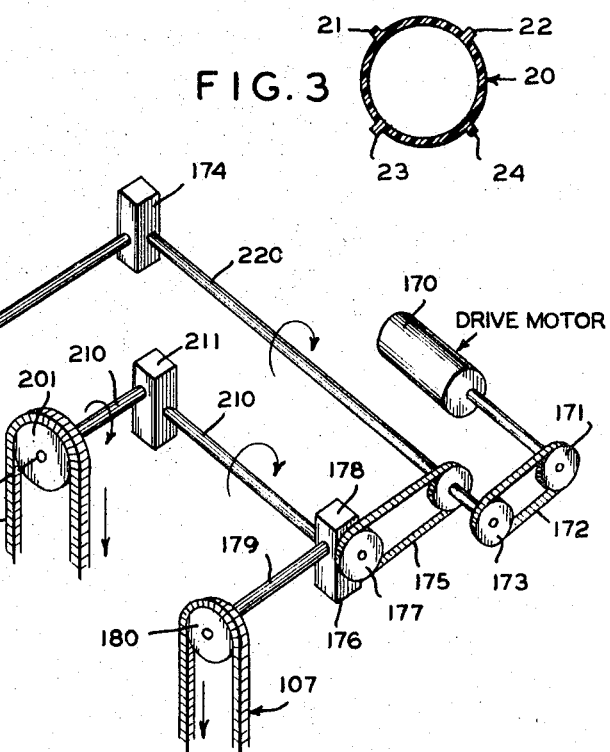
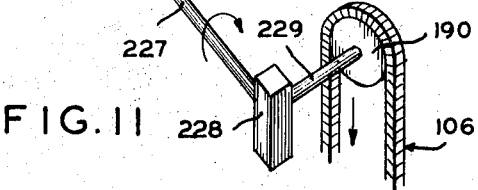
INVENTORS
JOHN J. QUACKENBUSH
HERBERT O. CORBETT
BY Allen A. Meyer, Jr.
ATTORNEY

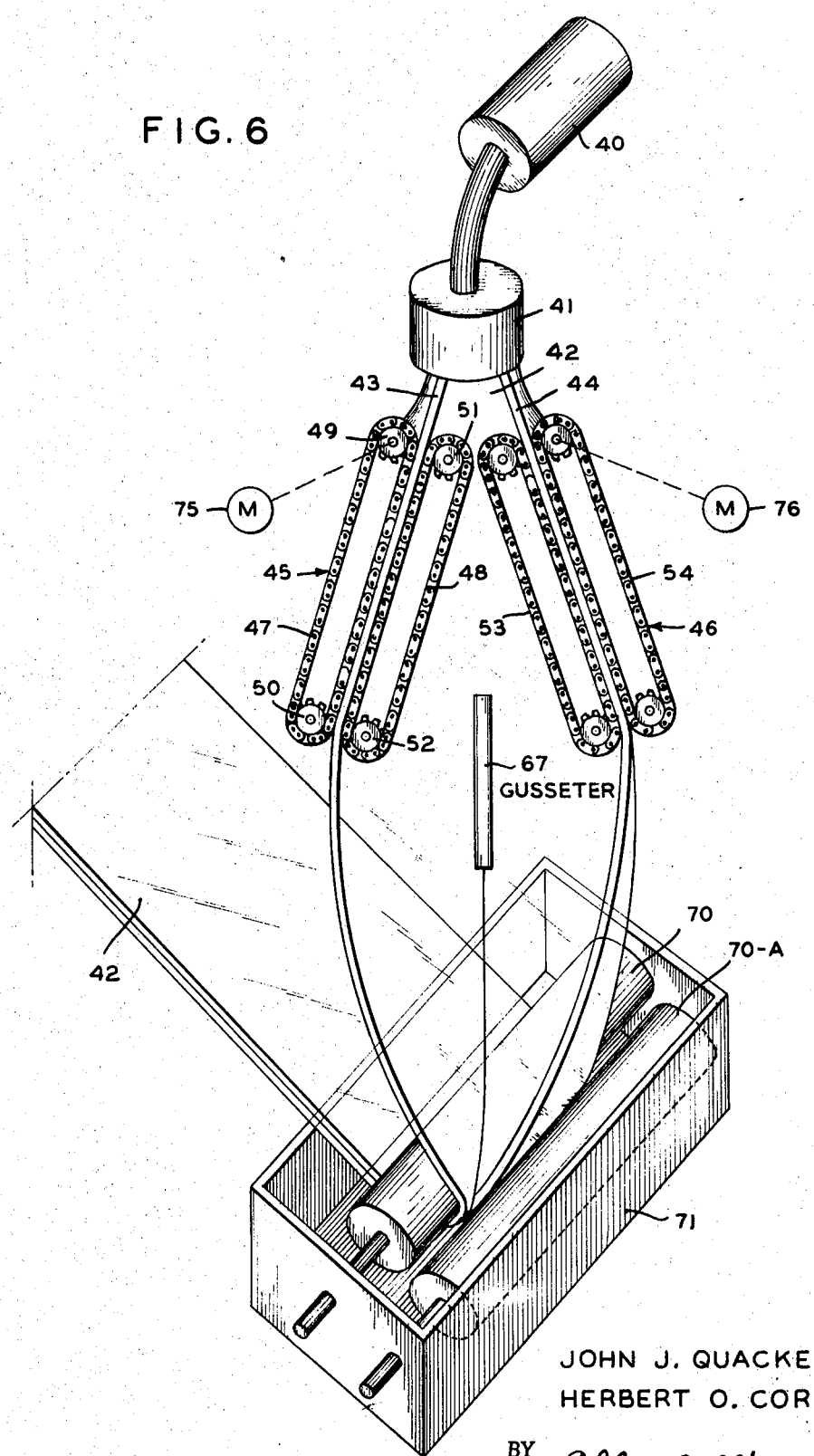

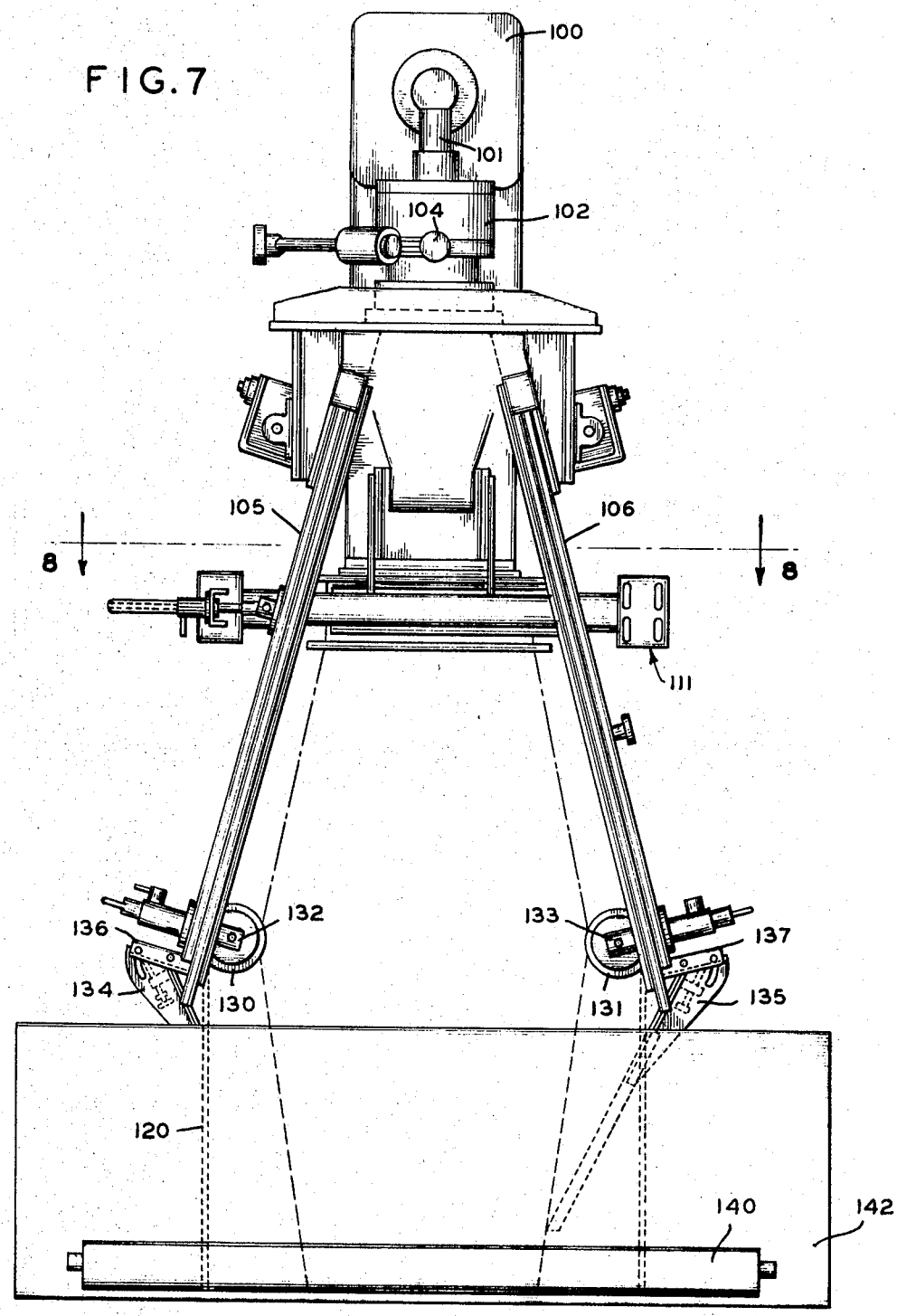

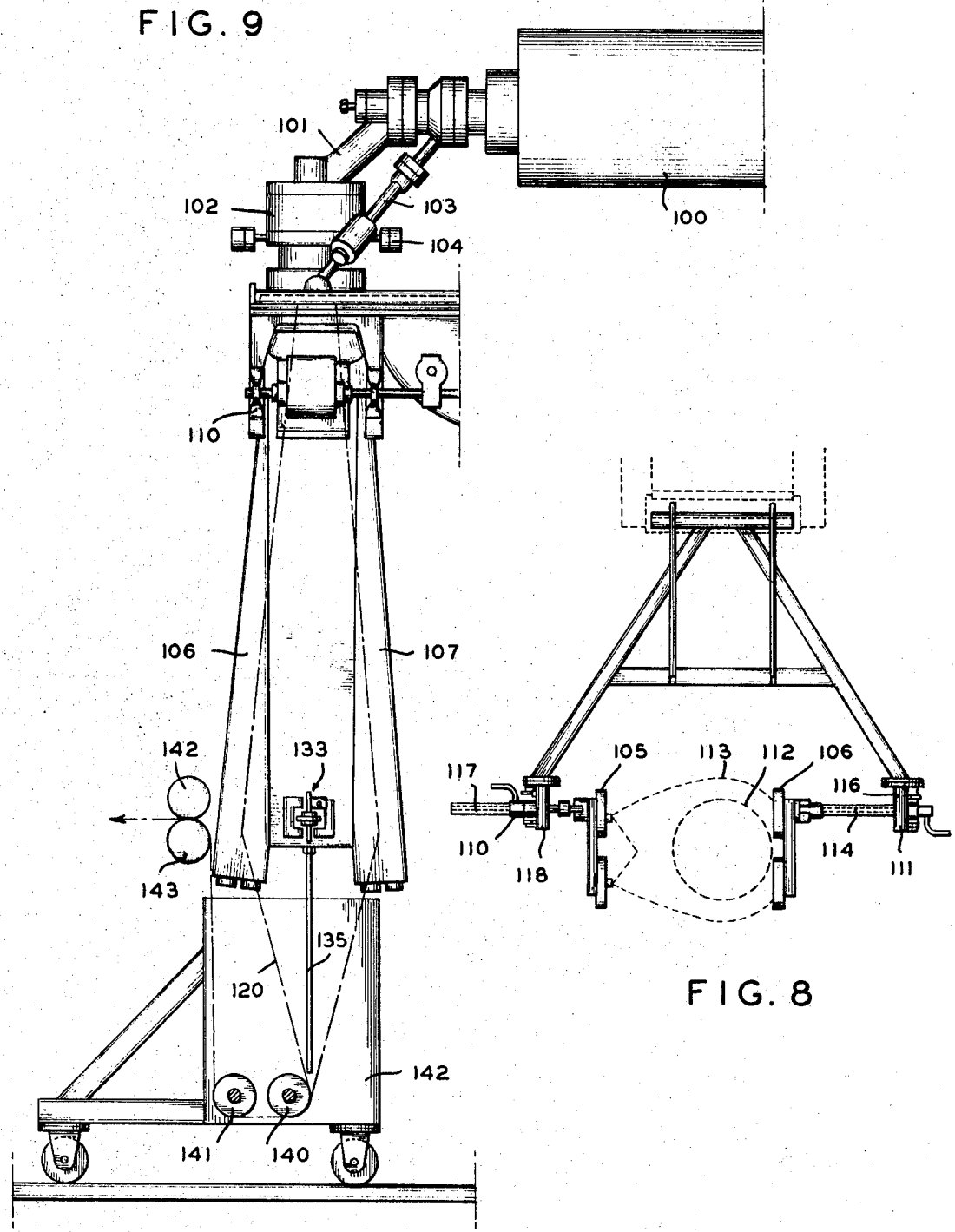

United States Patent Office

3,558,410
Patented Jan. 26, 1971

---

3,558,410
EXTRUSION METHOD AND APPARATUS FOR THE EXTRUSION OF RECTANGULAR TUBES OF THERMOPLASTIC SHEET
John J. Quackenbush, Monroe, and Herbert O. Corbett, Bridgeport, Conn., assignors to National Distillers and Chemical Corporation, New York, N.Y., a corporation of Virginia
Original application June 28, 1965, Ser. No. 467,609, now Patent No. 3,398,432, dated Aug. 27, 1968. Divided and this application Mar. 14, 1968, Ser. No. 810,912
Int. Cl. B32b 1/04
U.S. Cl. 161—44            2 Claims

ABSTRACT OF THE DISCLOSURE

A tubular plastic bag having a rectangular cross-section formed from a continuously extruded rectangular tube of plastic material.

---

This application is a division of copending application Ser. No. 467,609, filed June 28, 1965, now U.S. Pat. 3,398,432, in the name of John J. Quackenbush et al., entitled Extrusion Method and Apparatus for the Extrusion of Rectangular Tubes of Thermoplastic Sheet, and assigned to the assignee of the present invention.

This invention relates to a novel method and apparatus for the extrusion of rectangular thermoplastic material, and more specifically relates to a novel apparatus and method wherein a tubular extrusion die extrudes a tube of thermoplastic material which is gripped at two or more longitudinal portions thereof by a sheet or film-gripping and moving means such as a continuous chain grip, whereupon the tube is shaped in the form of a rectangle which is later used for the formation of rectangular bags.

The extrusion of tubular sheets of thermoplastic material is well known to the art. In general, this extrusion process includes the extrusion of a circular tube of material which is inflated by air captured between the extrusion die and a pair of overhead nip rolls which grip and flatten the tube and move the tube away from the die. Such tubes have always been circular tubes so that when those tubes are formed into a bag, the bag will try to assume a cylindrical configuration when filled. Such cylindrical bags are not ideally adapted to the most efficient stacking techniques, since its cylindrical or pillow shape will necessarily waste space and the "fill-factor" of the bags in a predetermined storage volume will be relatively poor as compared to the "fill-factor" of a rectangular package in which all the volume for storage of such bags will be completely filled.

In addition, a circular or elliptical bag produced from the circular tubular film of the prior art will have a uniform thickness throughout its body so that when bags of this material are stacked, abrasion at the side of the bag is applied to a material having the same thickness as the remainder of the bag.

The principal object of this invention is to provide a novel apparatus and method for the formation of a non-circular tube, and particularly a rectangular tube of thermoplastic material which can be extruded at much higher speed than with the previously known methods for extrusion of circular tubes of film, and further wherein the corners of the tube provide reinforced sections providing good abrasion-resistance when bags are stacked in a storage area.

In accordance with the present invention, the presently used film extrusion apparatus is retained where, however, the extrusion die discharges its circular tube downwardly where it is immediately gripped by a chain drive mechanism, or other suitable driving mechanism, at four longitudinal portions thereof defining the edges or corners of a rectangular shape. Thus, the speed of extrusion will now be determined by the speed of movement of these power driven chain means, or the equivalent thereof, so that the extrusion speed will be limited only by the capabilities of the resin being extruded and pressures available at the extruder. Therefore, extrusion speed is substantially increased.

As a further advantage of the novel apparatus and method of the invention, the gripping of the longitudinal portions of the tube being extruded form increased thickness sections at the corners of the tube, thereby to define reinforced corners for the tubular product extruded.

Thereafter, and through the provision of suitable gusseting techniques, the parallel side panels of the rectangular tube are gusseted. The rectangular gusseted bag will now fill to a square shape so that the filled bag will have a substantially improved fill-factor in storage. Moreover, when the square bags are filled and stacked, the increased thickness portions at their corners will define abrasion-resistant surfaces to improve the storage characteristics of the bag in adverse abrasion environments.

Preferably, the increased thickness portions in the longitudinal portions of the tube being extruded, which will define the corners of the rectangular tube, is caused by appropriately notching the standard extrusion die at these portions so that an additional thickness of material is available. This will also aid in the gripping of these longitudinal portions by the direct drive means such as a chain drive which is fully described in copending application Ser. No. 352,841, filed Mar. 18, 1964, now U.S. Patent 3,471,606, entitled Thermoplastic Articles, Apparatus and Process for Their Manufacture, in the name of Herbert O. Corbett et al. Note that this chain drive is described in the above noted application for the extension of a flat web of material. Clearly, however, this apparatus may be directly applied to the present invention where four such drives are provided for the formation of the desired rectangular shape. Obviously, other non-circular patterns could be formed in accordance with the invention such as a triangular cross-section for the plastic tube when using three chain drive systems, or a flat elliptical section when only two chain drives are used at opposite sides of the extruded film.

Accordingly, a primary object of this invention is to increase the extrusion speed of plastic tubular film.

Yet another object of this invention is to provide means for the extrusion of a tube of plastic film having a non-circular shape.

A further object of this invention is to provide a novel method and apparatus for the extrusion of a rectangular tube of plastic film.

Yet a further object of this invention is to directly drive an extruded tube of plastic film by a direct gripping means while the tube or extrudate is in a molten or semi-molten state other than a pair of nip rolls which flatten the tube.

A still further object of this invention is to provide a novel method and apparatus for the extrusion of a tube of thermoplastic film having longitudinal edge portions of increased thickness.

A still further object of this invention is to form a novel thermoplastic bag which fills to a square shape.

Another object of this invention is to provide a novel square-shaped bag of plastic material in which the corners of the bag have reinforced thickness.

These and other objects of this invention will become apparent from the following description when taken in connection with the drawings, in which:

FIG. 1 is a schematic cross-sectional view taken through an extrusion die which could be used for the present invention.

FIG. 2 is a plan view of FIG. 1 showing the discharge orifice of the die.

FIG. 3 is a cross-sectional view of the tube extruded from the die of FIGS. 1 and 2.

FIG. 4 illustrates the rectangular shape of the extruded tube when it exits from the web guide driving apparatus.

FIG. 5 is a perspective view of a completed rectangular bag formed from a web extruded in accordance with the present invention.

FIG. 6 is a perspective view which schematically illustrates the apparatus of the present invention.

FIG. 7 is a front plan view of the apparatus constructed in accordance with the invention.

FIG. 8 is a view of the apparatus of FIG. 7 when seen along the line 8—8 in FIG. 7, and particularly illustrates the spreader adjusting mechanism for adjusting the diverging angle of the web guides.

FIG. 9 is a side plan view of the apparatus of FIG. 8.

Figure 10:
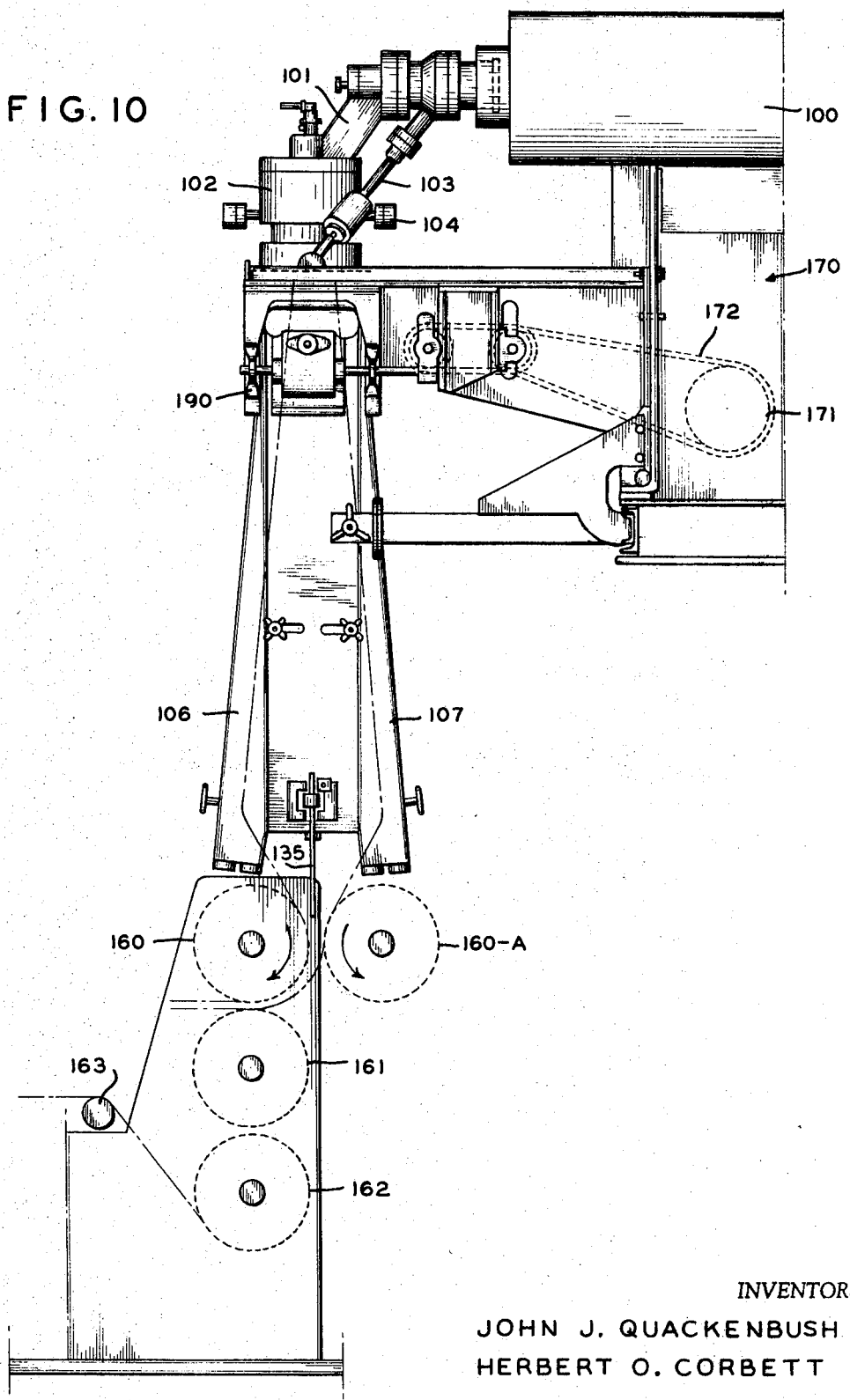
FIG. 10 is similar to FIG. 7, but further illustrates the driving motor mechanism, and illustrates the use of chill roll cooling as contrasted to fluid bath cooling in FIG. 7.

FIG. 11 schematically illustrates in perspective view the manner in which the single drive motor is connected to the drive sprockets of the four web guides used in FIG. 10.

Referring first to FIGS. 1 and 2, there is illustrated therein a typical extrusion die in a schematic fashion as including outer die body 10 which has a central mandrel 11 extending therethrough with the outer die body 10 and mandrel 11 supported on a common support body 12. Die body 10 and mandrel 11 define an annular chamber 13 which leads to a discharge orifice 13' from which a tube of thermoplastic material is extruded. Channel 13 communicates with a suitable port 14 which is connected to a suitable extruder 15. Extrusion dies of this general type are well known to the art, and any die of this general type structure can be used in accordance with the invention.

In particular, it is possible to use dies for the extrusion of laminated tubes which are of the type described in detail in copending application Ser. No. 350,220, filed Mar. 9, 1964 in the name of Herbert O. Corbett, entitled Laminated Products and Methods and Apparatus for Producing Same, and assigned to the assignee of the present invention, which is incorporated as a part of the present specification.

In accordance with the invention, the standard die is modified as by the provision of notches such as the notches 16 through 19 in FIG. 2, which are intentional notches, which will provide longitudinal thickened tube regions at angular positions corresponding to the notch positions.

Thus, as shown in FIG. 3, the extruded tube 20 which is immediately extruded through discharge orifice 13' will have thickened regions 21 through 24 at locations corresponding to the locations of notches 16 through 19, respectively, in FIG. 2. Typically, the notches 16 through 19 can have a dimension of .125 mil in depth and .125 mil in width, and can have various shapes in cross-section.

The purpose of the thickened sections is to provide means in which opposing chains, which are power driven, can obtain purchase on the film or grip the film in the manner described in above noted copending application Ser. No. 352,841, which discloses the manner in which power driven chains can be used to grasp the edge of a flat extruded film.

In accordance with the invention, a power driven chain web guide, or the equivalent thereof, is provided for each of the longitudinal extending portions 21 through 24 to drive the film in a direction away from the discharge orifice, thereby to move the tube extruded from the extrusion die at relatively great speed as compared to the typical prior art extrusion process, and further to form the tube into a rectangular shape. Typically, this drive ratio range will be 10 to 300 feet per minute. Such an arrangement will then provide a rectangular tube web which can be immediately formed by suitable bag-making equipment well known to the art into a rectangular gusseted bag.

Thus, as shown in FIG. 5, the rectangular web tube can, after forming and gusseting, be cut to lengths required of a bag 30 with the bottom cut sealed across as at seal 31, and with the opposing panels 32 and 33 joined by suitable side gussets such as the gusset 34 seen in FIG. 5 at the open end of the bag.

In addition, the side edges of the bag such as the side edges 35, 36 and 37, which are visible in FIG. 5, will be formed of the reinforced tube portions gripped by the chain drive mechanism to define abrasion-resistant side edges for the bag.

Moreover, when the bag is filled and as pointed out above, it will fill to a generally square shape as contrasted to the general oval shape of the prior art tubular bags, thereby permitting better stacking of the bags.

FIG. 6 illustrates the manner in which the apparatus of the invention may be arranged. Referring now to FIG. 6, there is schematically illustrated therein an extruder 40 of any typical prior art type connected to an extrusion die 41 which may be of the type generally shown in FIGS. 1 and 2, or any other desired prior art type, where, however, the die is preferably modified to provide longitudinally thickened regions in the extruded tube, as shown in FIG. 3.

Moreover, and where the prior art typically has the discharge orifice facing upwardly with the blown tube being pulled upwardly and through a pair of collapsing nip rolls, it is possible with the invention to arrange the die 41 upside down so that it discharges downwardly, as shown.

Thus, the die 41 discharges a tube 42 of generally circular shape with four reinforced sections, two of which are shown in FIG. 6 as longitudinal reinforced sections 43 and 44. Four power driven web guide systems are then provided, two of which can be seen in the view of FIG. 6, with two other systems at the rear of the tube and not visible in FIG. 6.

Thus, in FIG. 6, a first power driven web guide system 45 engages the bead 43 of tube 42, while the second power driven web guide system 46 engages the bead 44 in a similar manner. Each of the power driven web guide systems 45 and 46 include chains, such as chains 47 and 48 of system 45 which rotate in directions opposite to one another so that their adjacent chain sections move in the same direction and engage the extending bead 43. Thus, chain 47 is mounted between sprockets 49 and 50, while chain 48 is mounted on sprockets 51 and 52.

The spacing between the adjacent lengths of chains 47 and 48 is held constant as by the provision of suitable idler rollers (not shown) so that the bead 43 is crushed between the opposing chains 47 and 48 throughout their length. In a similar manner, chains 53 and 54 of system 46 have opposing sections which engage the bead 44 throughout its length in the chain. As previously noted, two other systems of opposing chains will be provided for the two other beads which cannot be seen in FIG. 6.

This system of four chains will then define a rectangular shape for the tube which finally leaves the ends of the power driven chain systems. Thus, as shown in FIG. 4, the extruded tube 42 leaving the ends of the chain driving systems (or the equivalent thereof) will have the extending beads 43 and 44, shown in FIG. 6, as well as the beads 60 and 61 which are driven by power driven web guide means on the opposite side of the tube in FIG. 6. Note that the location of the beads are such that the final shape of the extruded product is generally rectangular.

FIG. 4 further shows that the extruded tube leaving the end of the power driven guide means has gusset panels 65 and 66 on the opposing sides thereof. This gusseting is formed by suitable gusseters well known to the art which are placed on opposite sides of the extruded tube. Thus, FIG. 6 illustrates a gusseting plate 67 which collapses the tube inwardly to define the gusset 66 in FIG. 4. A similar gusseting means is provided on the opposite side of the tube between the two power driven guides to form the gusset 65.

After extrusion and gusseting, as shown in FIG. 6, the tube is between rolls 70–70A which are supported within a cooling fluid-receiving container 71. This will cause the tube to collapse as defined by its gusseted portions, whereupon the resulting rectangular web 42 is moved to suitable bag-making machinery, or the like. Note that the web guides can handle the extruded material while it is still in a molten or semi-molten stage.

It should be noted that FIG. 6 illustrates the invention for the formation of a rectangular tube. However, by the suitable placement of various individual web guides, it will be apparent that many varied geometric shapes could be formed, such as a triangular bag when using three power driven web guides, or when using only two power driven guide structures, a generally elliptical shape which meets at pointed ends.

The speed of extrusion in the device of FIG. 6 is substantially greater than that of the prior art arrangements since the speed is controlled by the speed of movement of the power driven web guides. Thus, each of the web guides may be driven by a suitable motor schematically shown as motors 75 and 76 in FIG. 6 connected to one sprocket of each of the chain driving systems. Similar motor means can be used for the other two chain driving systems, or alternatively, a common motor can drive all four of the chain driving systems.

Thus, so long as the die 41 is suitably designed and sufficient pressure is created at the extruder 40, virtually any extrusion speed can be used consistent with sufficient speed of chilling the web as it leaves the discharge orifice.

The schematic illustrations of FIGS. 1 through 6 contain clear directions to those skilled in the art for the construction of devices utilizing the concept of the present invention.

To supplement this schematic illustration, FIGS. 7 through 11 show one preferred form of the apparatus in more detail. It will be noted that FIG. 10 differs from FIG. 7 mainly in the detailed showing of the driving motor connection to the driving chains and in the use of chill roll cooling as contrasted to fluid bath cooling in FIGS. 7 and 9.

Referring first to FIGS. 7, 8 and 9, there is illustrated therein a main extruder 100 having an outlet conduit 101 which is connected to one input of extrusion die 102. Extrusion die 102 is of the type described in detail in above noted copending application Ser. No. 350,220, and is capable of delivering a laminated tube of plastic material through its discharge orifice. Note, however, that the die will be modified preferably by delivering thickened longitudinally extending sections which can be more easily gripped between the power driven chains located at the four corners of a rectangle. In all other respects, however, the die 102 is identical to that disclosed in the above noted application.

As is more fully described in the above application, a second conduit 103 is connected from extruder 100 to the die 102 for providing a second layer in the plastic extruded from the discharge orifice of the die.

A third connection 104 is also provided in the die 102 for connection to a second extruder (not shown) which can extrude a material other than the material being supplied from extruder 100 for the provision of further layers in the film being extruded.

A suitable support frame is provided for all of the components described herein, but need not be described in detail. Note, however, that the die is supported in a position which is inverted from the normal position of extrusion dies of this type in that the discharge orifice faces downwardly rather than upwardly in the common manner.

Four power driven web guide assemblies are then provided which diverge outwardly, and are located on what will become the side edges of the rectangular tube which is formed from the circular tube exiting from the discharge orifice of die 102. Three of these web guide assemblies are shown in FIGS. 7 and 9 as web guide assemblies 105, 106, 107 (FIG. 9) and a fourth identical unit which is located behind web guide 107 in FIG. 9 and behind web guide 105 in FIG. 7.

The details of the construction of each of these power driven web guides is given fully in above noted copending application Ser. No. 352,841.

The divergent angle of the web guides is then controlled by suitable adjustment mechanisms 110 and 111, shown in FIG. 7 and further shown in FIG. 8, the details of which are not necessary for the understanding of the present invention. Note that FIG. 8 schematically illustrates the original extruded shape of the tube extruded from die 102 as the dotted circle 112, and illustrates the manner in which this shape is changed to a generally rectangular form through the power driven web guides, as is illustrated in the dotted lines 113. It will also be noted that FIG. 8 illustrates the web guide 106 as being moved closer toward the axis of the extruded tube than the web guide 104 by threading the adjustment screw 114 further into the fixed support plate 116, while the adjustment screw 117 is threaded further out of its fixed support plate 118. This is merely to illustrate the manner in which angular adjustments can be made.

As the tube issuing from the die 102 moves downwardly by the various power driven web guides, it is expanded because of their divergent shape, and before reaching the end of the web guides, the tube, shown in dotted lines 120 in FIGS. 7 and 9, meets opposing gusset wheels 130 and 131 which are suitably supported by the carrying frames of the power driven web guides. Gusset wheels 130 and 131 are more particularly pivotally mounted on support posts 132 and 133 which are, in turn, adjustable by movement toward the axis of the film being extruded. Thus, the side panels of the rectangular film at this point are collapsed inwardly to begin to define a gusset.

As the film continues to move downwardly, it then engages gusset shields 134 and 135 which are adjustably secured for angular movement on extending support posts 136 and 137, respectively. The gusseting shields 134 and 135 are again of the standard prior art variety, and are aligned with their respective gusset wheels 132 and 131 to further collapse the gusseted sides inwardly before the film passes under pivotally mounted roll 140 contained in a trough 142 which is filled with a suitable cooling fluid such as water.

As best shown in FIG. 9, the extruded web which is collapsed when passing over roll 140 is moved upwardly over roll 141, and then through a pair of nip rolls 142 and 143 which move the web outwardly toward suitable bag-making machinery or roll-forming machinery in the usual manner.

In FIG. 10 all of the components identical to that of FIGS. 7, 8 and 9 are given a similar identifying numeral. FIG. 10 differs from FIGS. 7, 8 and 9 in the provision of chill rolls 160, 161, and 162, which replace the water bath of FIGS. 7 and 9. Thus, in FIG. 10, the web, after passing through the gusseting stage, is applied directly to the chill rolls 160, 161 and 162 and thereafter emerges over roller 163 to the subsequent bag-forming or roll-making machinery. If desired, back-up rollers such as roller 160a could be provided so that both the front and back faces of the extruded tube will be cooled at equal rate. Note that these rolls do not serve the purpose of a nip-type hand-off but are merely spaced such that the film is in good thermal contact with the rolls while they are far enough away from one another to avoid blocking.

FIG. 10 further shows the manner in which a single motor drive may be used for driving the drive sprockets of each of the four web guide assemblies used for driving the rectangular tube. More specifically, in FIG. 10, a common drive motor 170 is provided which has an output sprocket 171 which drives a chain 172. The chain 172 then engages a sprocket wheel 173 pivotally supported on post 174. A second sprocket wheel coaxial with sprocket wheel 173 then receives a chain 175 connected to sprocket wheel 176. The sprocket wheel 176 is connected to a shaft 177 of a standard gear box 178 which has an output shaft 179 connected to drive sprocket 180 of the web guide drive unit 107.

Through the use of additional gear boxes and shafts connected to the shaft of sprocket gear 173, the drive sprocket of the web guide unit behind web guide unit 107 is driven. This, in turn, may have a second output shaft which is connected to the drive sprocket for web guide unit 105 which is, in turn, further connected through suitable shafts and gear boxes to drive sprocket 190 of web guide unit 106.

A typical arrangement for permitting a common drive motor to drive each of the drive sprockets is best understood from FIG. 11 which schematically illustrates the drive motor 170 of FIG. 10 along with the drive sprockets 180 and 190 of FIG. 10 corresponding to web guide units 106 and 107.

FIG. 11 further illustrates drive sprockets 200 and 201 corresponding to the web guide drive 105 and the fourth web guide drive 201. As shown in FIG. 11, the drive motor drives the chain 172 which, in turn, drives chain 175 and the sprocket 176.

The sprocket 176 is connected to the gear box 178 so that it rotates shaft 179 and thus sprocket 180. In addition, the gear box 178 has an output shaft 210 which is connected to a gear 211 having an output shaft 212 connected to sprocket 201, thereby to provide the driving power for the fourth web guide unit 202.

The sprocket 173 is further adapted to drive shaft 220 which is connected to a gear box 221 which drives shaft 222. Shaft 222 is then connected to gear box 223 to drive shaft 224 connected to gear box 225. The gear box 225 then has output shafts 226 and 227. Shaft 226 directly drives sprocket 200, while shaft 227 is connected to gear box 228. The gear box 228 then has an output shaft 229 which drives sprocket 190.

Note that the gear ratios throughout the various systems are such that each of the drive sprockets 180, 190, 200 and 201 will rotate at an identical speed, thereby moving their chains at an identical speed.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

What is claimed is:

1. A thermoplastic bag having a rectangular cross-section and comprising front and rear panels and first and second side gussets, a heat seal along the lower portion of said panels and side gussets joining said panels and side gussets to form a bottom closure for said bag and reinforcing beads extending along and integrally formed on the side edges of said front and rear panels.

2. The bag of claim 1 wherein said panels and side gussets are free from longitudinal seams.

References Cited

UNITED STATES PATENTS

| 3,276,670 | 10/1966 | Harvey | 229—53 |
| 2,633,286 | 3/1953 | Claridge et al. | 229—53 |
| 3,027,065 | 3/1962 | Lindquist et al. | 229—53 |
| 3,321,354 | 5/1967 | Sloan et al. | 156—499 |

HAROLD ANSHER, Primary Examiner

J. C. GIL, Assistant Examiner

U.S. Cl. X.R.

93—35; 161—149; 229—53; 264—209